United States Patent [19]

Blahak et al.

[11] 4,133,943
[45] Jan. 9, 1979

[54] PROCESS FOR THE PRODUCTION OF POLYURETHANE ELASTOMERS AND FOAMS

[75] Inventors: Johannes Blahak, Cologne; Kuno Wagner, Leverkusen; Jan Mazánek, Cologne; Peter Haas, Haan, all of Germany

[73] Assignee: Bayer Aktiengesellschaft, Leverkusen, Germany

[21] Appl. No.: 899,431

[22] Filed: Apr. 24, 1978

[30] Foreign Application Priority Data

May 5, 1977 [DE] Fed. Rep. of Germany ....... 2720166

[51] Int. Cl.$^2$ ................... C08G 18/10; C08G 18/14; C08G 18/32
[52] U.S. Cl. ........................ 521/163; 528/63; 528/64; 528/70; 528/71; 521/129
[58] Field of Search ............... 260/2.5 AM, 77.5 AM, 260/75 NH, 29.2 TN

[56] References Cited

U.S. PATENT DOCUMENTS

| | | | |
|---|---|---|---|
| 3,479,310 | 11/1969 | Dieterich et al. | 260/29.2 TN |
| 3,491,050 | 1/1970 | Keberle et al. | 260/29.2 TN |
| 3,681,290 | 8/1972 | Meckel et al. | 260/77.5 AM |
| 3,794,621 | 2/1974 | Meckel et al. | 260/77.5 AM |
| 3,870,684 | 3/1975 | Witt et al. | 260/29.2 TN |
| 3,998,871 | 12/1976 | Carlson | 260/29.2 TN |
| 4,039,514 | 8/1977 | van Gulick | 260/77.5 AM |

*Primary Examiner*—H.S. Cockeram
*Attorney, Agent, or Firm*—Gene Harsh; Joseph C. Gil

[57] ABSTRACT

The instant invention relates to an improved process for the production of cellular or non-cellular polyurethane urea elastomers, in which diamines which contain ester groups are used as chain lengthening agents. A characteristic feature of the process according to the invention is the use of salts of aromatic diaminocarboxylic or sulphonic acids as a portion of the chain lengthening component. Elastomers produced by this process are distinguished by their improved mechanical properties, in particular their increased tensile strength and tear propagation resistance as well as their reduced permanent elongation.

8 Claims, No Drawings

PROCESS FOR THE PRODUCTION OF POLYURETHANE ELASTOMERS AND FOAMS

BACKGROUND OF THE INVENTION

Elastomeric polyurethane resins, as is well known, are built up of so-called soft segments and hard segments. The soft segments are derived from a higher molecular weight reactant which contains Zerewitinoff active hydrogen atoms, generally a polyester polyol, polyether polyol or polycarbonate polyol, while the hard segments are the urethane or urea groups formed by the reaction of chain lengthening agents with the polyisocyanate.

The physical properties of polyurethane resins are primarily determined by the number and strength of the intramolecular and intermolecular hydrogen bridge bonds formed between the various hard segments. If an otherwise constant formulation of reactants is used, the quality of the elastomers is thus limited by the number and type of hard segments present.

DESCRIPTION OF THE INVENTION

It has now surprisingly been found that if a mixture of aromatic diamines containing ester groups and aromatic diamines containing salt groups are used in certain proportions as chain lengthening agents, the hydrogen bridge bonds mentioned above are not deleteriously affected but are in addition reinforced by ionic bonds. The quality of the elastomer is thereby distinctly improved in particular in its structural stability, tensile strength, recoil elasticity and permanent elongation, particularly if the proportion of aromatic diamines which contain salt groups is from 2 to 50 mol %, preferably from 5 to 20 mol %, based on the total quantity of aromatic diamine chain lengthening agent. As has already been indicated above, it is believed that these improvements are due to a reinforcement of the binding forces between the hard segments by electric field forces while the crystalline structure and undisturbed periodicity of the polyurea hard segment are preserved. Of course, it is not the intent herein to be bound by this theory since it is possible that the improvements could possibly be explained by other theories.

The present invention thus relates to a process for the production of a cellular or non-cellular polyurethane urea elastomer by the reaction of a. an organic polyisocyanate with
b. a compound with a molecular weight of from 400 to 10,000 having at least two Zerewitinoff active hydrogen atoms,
c. an aromatic diamine having at least one carboxylic acid ester group or sulphonic acid ester group,
d. other aromatic diamines, and optionally
e. additional chain lengthening agents, blowing agents, catalysts and other known additives, which process is characterized in that the aromatic diamines used as component (d) have at least one carboxylic acid or sulphonic acid group in the form of its metal salt or substituted or unsubstituted ammonium salt and are used in the process in a quantity of from 2 to 50 mol %, and preferably 2 to 20 mol % based on the total molar quantity of the aromatic diamine chain lenghtening agent present (i.e. based on the total mols of components (c) and (d)).

According to the invention, component (c) may be any compound which contains at least two amino groups attached to an aromatic nucleus and at least one carboxylic acid ester or sulphonic acid ester group attached to an aromatic nucleus. Component (d) is preferably the same type of amine which contains the corresponding salt thereof. The alcohol component of the carboxylic acid or sulphonic acid ester group is an aliphatic or cycloaliphatic alcohol with from 1 to 18, preferably 1 to 6 carbon atoms, which may be branched and/or contain oxygen as hetero atom. Aromatic diamino carboxylic acid esters of this kind are known and have been described, for example, in "Angewandte Makromolekulare Chemie" 26, pages 29 to 45 (1972) and in German Offenlegungsschriften Nos. 1,803,635; 2,003,706; 2,025,900; 2,040,644; 2,040,650; 2,160,589 and 2,160,590. The corresponding sulphonic acid esters may also be used according to the invention but aromatic diamino carboxylic acid esters and their corresponding salts are preferred according to the invention.

The aromatic diaminocarboxylic acid esters preferably used according to the invention are those represented by the following general formula

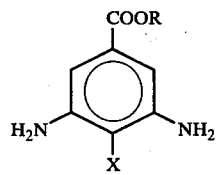

in which
R represents an aliphatic or cycloaliphatic group which may be straight or branched chain and/or contain oxygen as hetero atom and has from 1 to 18, and preferably 1 to 6, carbon atoms; the methyl group and the isobutyl group are particularly preferred; and
X represents hydrogen, a halogen atom, preferably chlorine, a straight or branched chain alkyl or alkoxy group having from 1 to 18, preferably 1 to 4 carbon atoms, a trifluoromethyl group or a cyano group.

Another group of aromatic diamino carboxylic acid esters which are preferred according to the invention are those represented by the following general formula

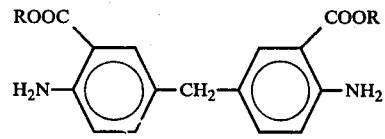

in which, R has the meaning specified above.

The preferred sulphonic acid esters according to the invention also correspond to the two formulae represented above, with the carboxylic acid ester group replaced by a sulphonic acid ester group.

According to the invention, the compounds used as component (d) are preferably salts of those aromatic diaminocarboxylic acids or sulphonic acids which are formed by saponification of the ester group in the compounds used as component (c). According to the invention, it is preferred to use salts of such carboxylic acids with alkali metals or metals of the Second and Third Main or sub-Group of the Periodic System of Elements (preferably magnesium and zinc) or ammonium salts or substituted ammonium salts. The latter are derived from primary, secondary or tertiary aliphatic, cycloaliphatic or aromatic monoamines or polyamines having from 1 to 15, preferably 3 to 12 carbon atoms. According to the invention, the salts of permethylated ethylene diamine, or trimethylamine and triethylamine are particularly preferred.

The polyisocyanates used as starting components according to the invention may be essentially any aliphatic, cycloaliphatic, araliphatic, aromatic or heterocyclic polyisocyanates such as those described, for example, by W. Siefken in Justus Liebigs Annalen der Chemie, 562, pages 75 to 136. Specific examples include ethylene diisocyanate; tetramethylene-1,4-diisocyanate; hexamethylene-1,6-diisocyanate; dodecane-1,12-diisocyanate; cyclobutane-1,3-diisocyanate; cyclohexane-1,3- and -1,4-diisocyanate and any mixtures of these isomers; 1-isocyanato-3,3,5-trimethyl-5-isocyanatomethyl-cyclohexane as described in German Auslegeschrift No. 1,202,785 and U.S. Pat. No. 3,401,190; hexahydrotolylene-2,4-diisocyanate and -2,6-diisocyanate and any mixtures of these isomers; hexahydrophenylene-1,3-diisocyanate and/or 1,4-diisocyanate; perhydrodiphenylmethane-2,4'-diisocyanate and/or -4,4'-diisocyanate; phenylene-1,3-diisocyanate and -1,4-diisocyanate; tolylene-2,4-diisocyanate and 2,6-diisocyanate and any mixtures of these isomers; diphenyl-methane-2,4'-diisocyanate and/or -4,4'-diisocyanate; naphthylene-1,5-diisocyanate; triphenylmethane-4,4',4"-triisocyanate; polyphenyl-polymethylene polyisocyanates which can be obtained by aniline-formaldehyde condensation followed by phosgenation and which have been described, for example, in British Pat. Nos. 874,430 and 848,671; m- and p-isocyanatophenyl-sulphonyl isocyanates as described in U.S. Pat. No. 3,454,606; perchlorinated aryl polyisocyanates such as those described, for example in German Auslegeschrift No. 1,157,601 and U.S. Pat. No. 3,277,138; polyisocyanates having carbodiimide groups as described in German Pat. No. 1,092,007 and U.S. Pat. No. 3,152,162; diisocyanates of the kind described in U.S. Pat. No. 3,492,330; polyisocyanates with allophanate groups as described e.g. in British Pat. No. 994,890; Belgian Pat. No. 761,626 and published Dutch Patent Application No. 7,102,524; polyisocyanates with isocyanurate groups, e.g. as described in U.S. Pat. No. 3,001,973; German Pat. Nos. 1,022,789; 1,222,067 and 1,027,394 and German Offenlegungsschriften Nos. 1,929,034 and 2,004,048; polyisocyanates with urethane groups as described e.g. in Belgian Pat. No. 752,261 or U.S. Pat No. 3,394,164, polyisocyanates with acylated urea groups as described in German Pat. No. 1,230,778; polyisocyanates with biuret groups as described e.g. in German Pat. No. 1,101,394, U.S. Pat. Nos. 3,124,605 and 3,201,372 and British Pat. No. 889,050; polyisocyanates prepared by telomerization reactions as described for example, in U.S. Pat. No. 3,654,106; polyisocyanates with ester groups, such as those described in for example, British Pat. Nos. 965,474 and 1,072,956; U.S. Pat. No. 3,567,763; and German Pat. No. 1,231,688; reaction products of the above mentioned isocyanates with acetals as described in German Pat. No. 1,072,385; and polyisocyanates containing polymeric fatty acid groups as described in U.S. Pat. No. 3,455,883.

The distillation residues obtained from the commercial production of isocyanates and still containing isocyanate groups may also be used, optionally as solutions in one or more of the above mentioned polyisocyanates. Any mixtures of the above mentioned polyisocyanates may, of course, also be used.

As a general rule, it is particularly preferred to use readily available polyisocyanates such as tolylene-2,4-diisocyanate and -2,6-diisocyanate and mixtures of these isomers ("TDI"); polyphenyl-polymethylene polyisocyanates of the kind which can be prepared by aniline formaldehyde condensation followed by phosgenation ("crude MDI"); and polyisocyanates containing carbodiimide groups, urethane groups, allophanate groups, isocyanurate groups, urea groups or biuret groups ("modified polyisocyanates").

The starting components used according to the invention also include compounds, generally with a molecular weight of 400 to 10,000, which have at least two isocyanate-reactive hydrogen atoms. These compounds may contain amino groups or carboxyl groups but are preferably polyhydroxyl compounds, and in particular compounds having from 2 to 8 hydroxyl groups, especially those with a molecular weight of from 800 to 10,000 and preferably 1000 to 6000. Examples of such hydroxyl group containing materials include, e.g., polyesters, polyethers, polythioethers, polyacetals, polycarbonates and polyester amides having at least 2, generally 2 to 8, and preferably 2 to 4 hydroxyl groups, of the kind known for the production of both homogeneous and cellular polyurethanes.

Suitable polyesters with hydroxyl groups include e.g. reaction products of polyvalent, preferably divalent alcohols, to which trivalent alcohols may be added and polyvalent, preferably divalent, carboxylic acids. Instead of free polycarboxylic acids, the corresponding polycarboxylic acid anhydrides or corresponding polycarboxylic acid esters of lower alcohols or mixtures thereof may, of course, be used for preparing the polyesters. The polycarboxylic acids may be aliphatic, cycloaliphatic, aromatic and/or heterocyclic and they may be substituted, e.g. by halogen atoms, and/or unsaturated. The following are mentioned as examples: Succinic acid; adipic acid; suberic acid; azelaic acid; sebacic acid; phthalic acid; isophthalic acid; trimellitic acid; phthalic acid anhydride; tetrahydrophthalic acid anhydride; hexahydrophthalic acid anhydride, tetrachlorophthalic acid anhydride, endomethylene tetrahydrophthalic acid anhydride; glutaric acid anhydride; maleic acid; maleic acid anhydride; fumaric acid; dimeric and trimeric fatty acids such as oleic acid which may be mixed with monomeric fatty acids; dimethyl terephthalate and terephthalic acid-bis-glycol esters. The following are examples of suitable polyhydric alcohols: Ethylene glycol; propylene glycol-(1,2) and -(1,3); butylene glycol-(1,4) and -(2,3); hexanediol-(1,6); octanediol-(1,8); neopentyl glycol; cyclohexanedimethanol (1,4-bis-hydroxy-methylcyclohexane); 2-methyl-1,3-propanediol; glycerol; trimethylolpropane; hexanetriol-(1,2,6); butanetriol-(1,2,4); trimethylolethane; pentaerythritol; quinitol; mannitol and sorbitol; methylglycoside; diethylene glycol; triethylene glycol; tetraethylene glycol; polyethylene glycols; dipropylene glycol; polypropylene glycols; dibutylene glycol and polybutylene glycols. The polyesters may also contain a proportion of carboxyl end groups. Polyesters of lactones such as ε-caprolactone or hydroxycarboxylic acids such as ω-hydroxycaproic acid may also be used.

The polyethers used according to the invention which have at least 2, generally 2 to 8 and preferably 2 to 3 hydroxyl groups are also known per se and are prepared, for example, by the polymerization of epoxides such as ethylene oxide, propylene oxide, butylene oxide, tetrahydrofuran, styrene oxide or epichlorohydrin, either each on its own, e.g. in the presence of boron trifluoride, or by addition of these epoxides, either as mixtures or successively, to starting components having reactive hydrogen atoms, such as water, alcohols, ammonia or amines. Specific useful starters include ethylene glycol, propylene glycol-(1,3) or -(1,2), trimethylolpropane, 4,4'-dihydroxydiphenylpropane, aniline, ethanolamine or ethylene diamine. Sucrose polyethers may also be used according to the invention, e.g. those described in German Auslegeschriften Nos. 1,176,358 and 1,064,938. It is in many cases preferred to use polyethers which contain predominant amounts of primary hydroxyl groups (up to 90% by weight, based on all the hydroxyl groups present in the polyether). Polyethers modified with vinyl polymers, e.g. the compounds obtained by polymerization of styrene or acrylonitrile in the presence of polyethers as described in U.S. Pat. Nos. 3,383,351; 3,304,273; 3,523,093 and 3,110,695 and German Pat. No. 1,152,536 are also suitable, as are polybutadienes which have hydroxyl groups.

Particularly to be mentioned among the polythioethers are the condensation products obtained by reacting thiodiglycol on its own and/or with other glycols, dicarboxylic acids, formaldehyde, aminocarboxylic acids or amino alcohols. The products obtained are polythio mixed ethers, polythioether esters or polythio ether ester amides, depending on the co-components.

Suitable polyacetals include, for example, the compounds which can be prepared from glycols such as diethylene glycol, triethylene glycol, 4,4'-dioxethoxydiphenyl dimethylmethane, hexanediol and formaldehyde. Suitable polyacetals for the purpose of the invention may also be prepared by the polymerization of cyclic acetals.

The polycarbonates with hydroxyl groups used may be of the kind known per se, for example those which can be prepared by the reaction of diols such as propanediol-(1,3), butanediol-(1,4) and/or hexanediol-(1,6), diethylene glycol, triethylene glycol or tetraethylene glycol with diarylcarbonates, e.g. with diphenylcarbonate or phosgene.

Suitable polyester amides and polyamides include, for example, the predominantly linear condensates prepared from polyvalent saturated and unsaturated carboxylic acids or their anhydrides and polyvalent saturated and unsaturated amino alcohols, diamines, polyamines and mixtures thereof.

Polyhydroxyl compounds already containing urethane or urea groups and modified or unmodified natural polyols such as castor oil, carbohydrates or starch may also be used. Addition products of alkylene oxides and phenolformaldehyde resins or of alkylene oxides and urea formaldehyde resins are also suitable for the purpose of the invention.

Representatives of the many and varied compounds which may be used according to the invention are known and have been described, for example, in High Polymers, Vol. XVI, "Polyurethanes, Chemistry and Technology" by Saunders-Frish, Interscience Publishers, New York, London, Volume I, 1962, pages 32 to 42 and pages 44 to 54 and Volume II, 1964, pages 5 to 6 and 198 to 199 and in Kunststoff-Handbuch, Volume VII, Vieweg-Höchtlen, Carl-Hanser-Verlag, Munich, 1966, pages 45 to 71.

Mixtures of the above mentioned compounds which contain at least two isocyanate-reactive hydrogen atoms and have a molecular weight of from 400 to 10,000 may, of course, also be used, for example mixtures of polyethyers and polyesters.

The starting components used according to the invention may also include compounds with a molecular weight of from 32 to 400 which have at least two isocyanate-reactive hydrogen atoms. These compounds are also understood to be compounds containing hydroxyl groups and/or amino groups and/or thiol groups and/or carboxyl groups, preferably hydroxyl groups and/or amino groups, and they serve as chain lengthening agents or cross-linking agents. They generally have from 2 to 8 isocyanate-reactive hydrogen atoms, and preferably 2 or 3 such hydrogen atoms.

In this case again there may be used mixtures of various compounds having a molecular weight of from 32 to 400 and containing at least two isocyanate reactive hydrogen atoms.

The following are mentioned as examples of such compounds: Ethylene glycol; propylene glycol-(1,2) and -(1,3), butylene glycol-(1,4) and -(2,3); pentanediol-(1,5); hexanediol-(1,6); octanediol-(1,8); neopentylglycol; 1,4-bis-hydroxymethylcyclohexane, 2-methyl-1,3-propanediol; glycerol; trimethylolpropane; hexanetriol-(1,2,6); trimethylolethane; pentaerythritol; quinitol; mannitol and sorbitol; diethyleneglycol; triethyleneglycol; tetraethylene glycol; polyethyleneglycols with a molecular weight of up to 400; dipropyleneglycol; polypropyleneglycols with a molecular weight of up to 400; dibutylene glycol; polybutyleneglycols with a molecular weight of up to 400; castor oil; 4,4'-dihydroxy-diphenylpropane; dihydroxymethylhydroquinone; 1,4-phenylene-bis-($\beta$-hydroxyethylether); ethanolamine; N-methyl-ethanolamine; diethanolamine; N-methyl-diethanolamine; triethanolamine; 3-aminopropanol; ester diols represented by the gereral formulae

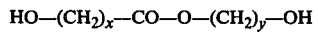

HO—(CH$_2$)$_x$—CO—O—(CH$_2$)$_y$—OH and

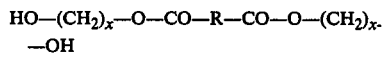

HO—(CH$_2$)$_x$—O—CO—R—CO—O—(CH$_2$)$_x$—OH in which
R represents an alkylene group with from 1 to 10, preferably 2 to 6 carbon atoms,
x = 2 to 6 and
y = 3 to 5,
e.g. $\delta$-hydroxybutyl-$\epsilon$-hydroxy-caproic acid ester, $\omega$-hydroxyhexyl-$\gamma$-hydroxybutyric acid ester; adipic acid-bis-($\beta$-hydroxyethyl)-ester and terephthalic acid-bis-($\beta$-hydroxyethyl)-ester; and diolurethanes represented by the general formula;

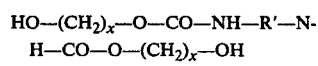

HO—(CH$_2$)$_x$—O—CO—NH—R'—NH—CO—O—(CH$_2$)$_x$—OH in which
R' represents an alkylene, cycloalkylene or arylene group having 2 to 15, preferably 2 to 6 carbon atoms and
x represents a number of between 2 and 6,
e.g. 1,6-hexamethylene-bis-($\beta$-hydroxyethylurethane) or 4,4'-diphenylmethane-bis-($\delta$-hydroxybutylurethane); diolureas represented by the general formula:

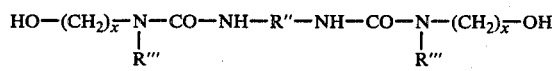

in which
R" represents an alkylene, cycloalkylene or arylene group having from 2 to 15, preferably 2 to 9 carbon atoms,
R''' represents hydrogen or a methyl group and x = 2 or 3,
e.g. 4,4'-diphenylmethane-bis-(β-hydroxyethylurea) or the compound represented by the following formula

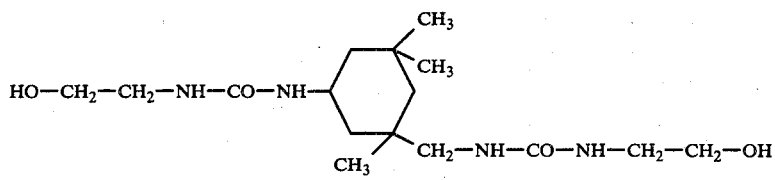

Aliphatic diamines suitable for the purpose of the invention include, for example, ethylenediamine; 1,4-tetramethylenediamine; 1,11-undecamethylenediamine; 1,12-dodecamethylenediamine and mixtures thereof; 1-amino-3,3,5-trimethyl-5-aminomethylcyclohexane; 2,4- and 2,6-hexahydrotolylenediamine and mixtures thereof; perhydro-2,4'- and -4,4'-diaminodiphenylmethane p-xylylenediamine; bis-(3-aminopropyl)-methylamine, etc.. Hydrazine and substituted hydrazines may also be used, e.g. methylhydrazine, N,N'-dimethylhydrazine and their homologues and acid dihydrazides, e.g. carbodihydrazide, oxalic acid dihydrazide, the dihydrazides of malonic acid, succinic acid, glutaric acid, adiptic acid, β-methyladipic acid, sebacic acid, hydracrylic acid and terephthalic acid, semicarbazido-alkylene hydrazides such as β-semicarbazidopropionic acid hydrazide as described in German Offenlegungsschrift No. 1,770,591; semicarbazido-alkylenecarbazic esters such as 2-semicarbozido-ethyl-carbazic ester as described in German Offenlegungsschrift No. 1,918,504 or also amino semicarbazide compounds such as β-aminoethyl-semicarbazidocarbonate as described in German Offenlegungsschrift No. 1,902,931.

Tolylene diamine, 4,4'-diaminodiphenylmethane and 4,4'-diaminodiphenyl disulphide are examples of suitable aromatic diamines.

According to the invention, compounds such as 1-mercapto-3-aminopropane, substituted or unsubstituted amino acids such as glycine, alanine, valine, serine and lysine and substituted or unsubstituted dicarboxylic acids such as succinic acid, adipic acid, phthalic acid, 4-hydroxyphthalic acid and 4-aminophthalic acid may also be used as chain lengthening agents.

Compounds which are monofunctional in their reaction with isocyanates may also be used as so-called chain breakers in proportions of from 0.01 to 10% by weight, based on the polyurethane solids content. Examples of such monofunctional compounds include monoamines such as butylamine and dibutylamine, octylamine, stearylamine, N-methylstearylamine, pyrrolidine, piperidine and cyclohexylamine, monohydric alcohols such as butanol, 2-ethylhexanol, octanol, dodecanol, the various amyl alcohols, cyclohexanol, ethylene glycol monoethyl ether, and the like.

According to the invention, however, there may also be used polyhydroxy compounds in which high molecular weight polyadducts or polycondensates are contained in a finely dispersed or dissolved form. Such modified polyhydroxyl compounds are obtained when polyaddition reactions (e.g. reactions between polyisocyanates and aminofunctional compounds) or polycondensation reactions (e.g. between formaldehyde and phenols and/or amines) are carried out in situ in the above mentioned polyhydroxyl compounds. Processes of this kind are known and have been described, for example, in German Auslegeschriften Nos. 1,168,075 and 1,260,142 and in German Offenlegungsschriften Nos. 2,324,134; 2,423,984; 2,512,385; 2,513,815; 2,550,796; 2,550,797; 2,550,833 and 2,550,862. These modified compounds can also be obtained as described in U.S. Pat. No. 3,869,413 or German Offenlegungsschrift No. 2,550,860 by mixing a previously prepared aqueous polymer dispersion with a polyhydroxyl compound and then removing the water from the mixture. When modified polyhydroxyl compounds of the kind mentioned above are used as starting components for the polyisocyanate polyaddition process, polyurethane resins with substantially improved mechanical properties are in many cases obtained.

According to the invention, water and/or readily volatile organic substances may be used as blowing agents. Suitable organic blowing agents include, for example, acetone, ethyl acetate and halogen substituted alkanes such as methylene chloride, chloroform, ethylidene chloride vinylidene chloride, monofluorotrichloromethane, chlorodifluoromethane, and dichlorodifluoromethane as well as butane, hexane, heptane and diethyl ether. The effect of a blowing agent can also be obtained by the addition of compounds which decompose at temperatures above room temperature to release gases such as nitrogen, e.g. azo compounds such as azoisobutyric acid nitrile. Further examples of blowing agents and the use of blowing agents are known and have been described, e.g. in Kunststoff-Handbuch, Volume VII, published by Vieweg and Höchtlen, Carl-Hanser-Verlag, Munich 1966, on pages 108 and 109, 453 to 455 and 507 to 510.

Catalysts are also frequently used according to the invention. The catalysts added may be of the type known per se. Examples include tertiary amines such as triethylamine, tributylamine, N-methylmorpholine, N-ethylmorpholine, N-cocomorpholine, N,N,N',N'-tetramethyl-ethylenediamine, 1,4-diazabicyclo-(2,2,2)-octane, N-methyl-N'-dimethylaminoethylpiperazine, N,N-dimethylbenzylamine, bis-(N,N-diethylaminoethyl)-adipate, N,N-diethylbenzylamine, pentamethyldiethylenetriamine, N,N-dimethylcyclohexylamine, N,N,N',N'-tetramethyl-1,3-butanediamine, N,N-dimethyl-β-phenylethylamine, 1,2-dimethylimidazole and 2-methylimidazole. Mannich bases known per se obtained from secondary amines such as dimethylamine and aldehydes, preferably formaldehyde, or ketones such as acetone, methyl ethyl ketone or cyclohexanone and phenols such as phenol, nonylphenol or bisphenol may also be used at catalysts. Catalysts which consist of tertiary amines which contain isocyanate-reactive hydrogen atoms may also be used and include triethanolamine, triisopropanolamine, N-methyldiethanolamine, N-ethyldiethanolamine, N,N-dimethylethanolamine and their reaction products with alkylene oxides such as propylene oxide and/or ethylene oxide.

Silaamines having carbon-silicon bonds as described e.g. in German Pat. No. 1,229,290 and U.S. Pat. No. 3,620,984 may also be used as catalysts e.g., 2,2,4-trimethyl-2-silamorpholine or 1,3-diethylaminomethyl-tetramethyl-disiloxane.

Basic nitrogen compounds such as tetraalkylammonium hydroxides, alkali metal hydroxides such as sodium hydroxide, alkali metal phenolates such as sodium phenolate and alkali metal alcoholates such as sodium methylate may also be used as catalysts. Hexahydrotriazines are also suitable catalysts.

Organic metal compounds may also be used as catalysts according to the invention. Particularly preferred are organic tin compounds.

The organic tin compounds used are preferably tin-(II) salts of carboxylic acids such as tin(II) acetate, tin(II) octoate, tin(II) ethyl hexoate and tin(II) laurate and tin(IV) compounds such as dibutyl tin oxide, dibutyl tin dichloride, diutyl tin diacetate, dibutyl tin dilaurate, dibutyl tin maleate or dioctyl tin diacetate. All the above mentioned catalysts may, of course, be used as mixtures.

Further examples of catalysts which may be used according to the invention and details concerning the activity of the catalysts are known and are described, e.g., in Kunststoff-Handbuch, Volume VII, published by Vieweg and Höchtlen, Carl-Hanser-Verlag, Munich 1966, on pages 96 to 102.

The catalysts are generally used in a quantity of between about 0.001 to 10% by weight, based on the quantity of compounds with a molecular weight of from 400 to 10,000 which have at least two hydrogen atoms capable of reacting with isocyanates.

Surface active additives such as emulsifiers and foam stabilizers may also be used according to the invention. Suitable emulsifiers include e.g. the sodium salts of ricinoleic sulphonates or salts of fatty acids with amines such as oleic acid diethylamine or stearic acid diethanolamine. Alkali metal or ammonium salts of sulphonic acids such as dodecylbenzenesulphonic acid or dinaphthylmethane disulphonic acid or of fatty acids such as ricinoleic acid or of polymeric fatty acids may also be used as surface active additives.

Suitable foam stabilizers include, in particular, the polyether siloxanes, and especially those which are water-soluble. These compounds generally have a polydimethyl siloxane group attached to a copolymer of ethylene oxide and propylene oxide. Foam stabilizers of this kind are known and have been described, for example, in U.S. Pat. Nos. 2,834,748; 2,917,480 and 3,629,308.

Other additives which may also be used according to the invention include reaction retarders, e.g. substances which are acid in reaction such as hydrochloric acid or organic acid halides; cell regulators known per se such as paraffins or fatty alcohols or dimethyl polysiloxanes; pigments, dyes, flame retarding agents known per se such as tris-chloroethylphosphate, tricresylphosphate or ammonium phosphate and polyphosphate; stabilizers against ageing and weathering; plasticizers; fungistatic and bacteriostatic substances; and fillers such as barium sulphate, kieselguhr, carbon black or whiting.

Other examples of surface active additives, foam stabilizers, cell regulators, reaction retarders, stabilizers, flame retarding substances, plasticizers, dyes, fillers and fungistatic and bacteriostatic substances which may be used according to the invention and details concerning the use and mode of action of these additives are known and may be found, e.g., in Kunststoff-Handbuch, Volume VII, published by Vieweg and Höchtlen, Carl-Hanser-Verlag, Munich 1966, on pages 103 to 113.

The synthetic resins according to the invention are produced by known processes. For producing homogeneous polyurethane elastomers, for example, a prepolymer is preferably first prepared from the polyol component and an excess of diisocyanate (NCO/OH ratio preferably 1.8 to 3.3), and this prepolymer is then reacted according to the invention with the diamine/diamine salt mixture in the preferred molar ratio ($NCO/NH_2$) of 0.8 to 1.2 to produce the end product. The prepolymer, which may be purified by thin layer evaporation, may first be prelengthened with part of the chain lengthening agent ($NCO/NH_2 >$ about 1.5:1) before it is reacted with the remainder of the chain lengthening agent. If desired, this second step of the process may be carried out with a chain lengthening agent, diamine or diol, other than the diamines used according to the invention.

When producing polyurethane foams according to the invention, the individual components are mixed together by the usual methods but the usual low molecular weight diamines or diols are partly or completely replaced by the diamine/diamine salt mixtures used according to the invention.

Although the invention has been described in detail for the purpose of illustration, it is to be understood that such detail is solely for that purpose and that variations can be made therein by those skilled in the art without departing from the spirit and scope of the invention except as it may be limited by the claims.

EXAMPLES

EXAMPLE 1 a. Prepolymer A 2113 g (1 mol) of a polypropylene oxide diol containing 20% by weight of a dispersed filler of tolylene diisocyanate (20% 2,6-isomer) and hydrazine, which filler has been prepared in situ according to German Offenlegungsschrift No. 2,550,796, is reacted with 365.4 g of tolylene diisocyanate (20% 2,6- and 80% 2,4-isomer) at 120° C. for 30 minutes. The final isocyanate content obtained is 3.73% by weight.

b. Prepolymer B 2000 g (1 mol) of a polypropylene oxide diol are reacted with 365.4 g of the same tolylene diisocyanate under the same conditions as prepolymer A. Isocyanate content of the prepolymer: 3.91 % by weight.

c. Process According to the Invention 127.7 g (0.054 mol) of prepolymer B are added to 89.2 g of prepolymer A (0.036 mol). The mixture is heated to 90° C. and degasified with stirring at 15 Torr for one minute. 19.6 g (0.081 mol) of 4-chloro-3,5-diaminobenzoic acid isobutyl ester and 1.83 g (0.009 mol) of the ammonium salt of 4-chloro-3,5-diaminobenzoic acid are then stirred in within 20 seconds. The mixture is poured on a preheated plate (110° C.) and cured at 110° C. for 24 hours.

A polymer having the following properties is obtained:

| | | |
|---|---|---|
| Tensile strength: | 14.4 MPa | (DIN 53 504) |
| Structural stability: | 330 N | (DIN 53 504) |
| Elongation on tearing: | 417 % | (DIN 53 504) |
| Elongation after 1 minute | 26 % | (DIN 53 504) |
| Shore hardness A | 88 | (DIN 53 505) |
| Elasticity | 45 % | (DIN 53 512) |

Comparison Experiment

The method is carried out in the same way as described in Example 1 but with 21.8 g (0.09 mol) of 4-chloro-3,5-diaminobenzoic acid isobutyl ester (i.e. without salt). The polymer obtained has the following properties:

| | | |
|---|---|---|
| Tensile strength: | 10.7 MPa | (DIN 53 504) |
| Structural stability: | 343 N | (DIN 53 504) |
| Elongation on tearing: | 504 % | (DIN 53 504) |
| Elongation after 1 minute | 37 % | (DIN 53 504) |
| Shore hardness A | 85 | (DIN 53 505) |
| Elasticity | 41 % | (DIN 53 505) |

EXAMPLE 2 a. Prepolymer C 1429 g of a copolymer of 50% by weight of propylene oxide and 50% by weight of ethylene oxide (molecular weight 2000) which has been grafted with 20% by weight of styrene/acrylonitrile (portions by weight 40:60) are mixed with 219.2 g of tolylene diisocyanate (80% 2,4- and 20% 2,6-isomer) with stirring at 120° C. for 30 minutes. (Isocyanate content: 3.55% by weight).

b. Process According to the Invention

A mixture of 89.2 g (0.036 mol) of prepolymer A and 150 g (0.054 mol) of prepolymer C is heated to 90° C. with stirring and degasified for 1 minute at 15 Torr. 19.6 g (0.081 mol) of 4-chloro-3,5-diaminobenzoic acid isobutyl ester and 1.83 g (0.009 mol) of the ammonium salt of 4-chloro-3,5-diaminobenzoic acid are then stirred in within 20 seconds. The mixture is poured on a preheated plate (110° C.) and cured at 110° C. for 24 hours. A polymer having the following properties is obtained:

| | |
|---|---|
| Tensile strength: | 14.7 MPa |
| Structual stability | 342 N |
| Elongation on tearing: | 263 % |
| Elongation after 1 minute | 19 % |
| Shore hardness A: | 90 |
| Elasticity: | 43 % |

Comparison Experiment

The procedure is carried out in the same way as described in Example 2 but with 21.8 g (0.09 mol) of 4-chloro-3,5-diaminobenzoic acid isobutyl ester (i.e. without salt). The resulting polymer has the following properties:

| | |
|---|---|
| Tensile strength: | 12.9 MPa |
| Structural stability: | 316 N |
| Elongation on tearing: | 318 % |
| Elongation after 1 minute | 30 % |
| Shore hardness A | 88 |
| Elasticity: | 39 % |

EXAMPLE 3

213 g of prepolymer B (0.09 mol) are heated to 90° C. and degasified for one minute at 15 Torr. 18.5 g (0.0765 mol) of 3,5-diamino-5-chloro-benzoic acid isobutyl ester and 3.3 g (0.00675 mol) of the tetramethyl ethylene diamine-bis-salt of 3,5-diamino-5-chlorobenzoic acid are stirred in within 20 seconds. The mixture is poured on a preheated plate (110° C.) and cured at 110° C. for 24 hours. A polymer having the following properties is obtained:

| | |
|---|---|
| Tensile strength: | 9.3 MPa |
| Structural stability: | 306 N |
| Elongation on tearing: | 653 % |
| Elongation after 1 minute | 47 % |
| Shore hardness A | 81 |
| Elasticity: | 54 % |

Comparison Experiment

The procedure is carried out in the same way as described in Example 3 but with 21.8 g (0.09 mol) of 4-chloro-3,5-diaminobenzoic acid isobutyl ester (i.e. without salt). The polymer obtained has the following properties:

| | |
|---|---|
| Tensile strength: | 9.0 MPa |
| Structural stability: | 285 N |
| Elongation on tearing: | 830 % |
| Elongation after 1 minute | 79 % |
| Shore hardness A: | 86 |
| Elasticity: | 47 % |

EXAMPLE 4

236.5 g (0.1 mol) of prepolymer B are heated to 90° C. and degasified for one minute at 15 Torr with stirring. 23.0 g (0.095 mol) of 4-chloro-3,5-diaminobenzoic acid isobutyl ester and 1.03 g (0.005 mol) of the ammonium salt of 4-chloro-3,5-diaminobenzoic acid are then stirred in within 20 seconds. The reaction mixture is poured on a preheated plate (110° C.) and cured at 110° C. for 24 hours.

A polymer having the following properties is obtained:

| | |
|---|---|
| Tensile strength: | 9.4 MPa |
| Structural stability: | 321 N |
| Elongation on tearing: | 662 % |
| Elongation after 1 minute | 60 % |
| Shore hardness A | 84 |
| Elasticity: | 52 % |

Comparison Experiment

The procedure is carried out in the same way as described in Example 4 but with 24.2 g (0.1 mol) of 4-chloro-3,5-diaminobenzoic acid isobutyl ester (i.e. without salt). The resulting polymer has the following properties:

| | |
|---|---|
| Tensile strength: | 9.0 MPa |
| Structural stability: | 285 N |
| Elongation on tearing: | 830 % |
| Elongation after 1 minute | 79 % |
| Shore hardness A: | 86 |

| | |
|---|---|
| Elasticity | 47 % |

EXAMPLE 5

236.5 g (0.1 mol) of prepolymer B are heated to 90° C. and degasified for one minute at 15 Torr. 21.8 g (0.09 mol) of 3,5-diamino-4-chloro-benzoic acid isobutyl ester and 2.15 g of the triethylamine salt of 3,5-diamino-4-chloro-benzoic acid are then stirred in within 20 seconds. The reaction mixture is poured on a preheated plate (110° C.) and cured at 110° C. for 24 hours.

A polymer having the following properties is obtained:

| | |
|---|---|
| Tensile strength: | 9.5 MPa |
| Structural stability: | 383 N |
| Elongation on tearing: | 595 % |
| Elongation after 1 minute | 54 % |
| Shore hardness A: | 86 |
| Elasticity: | 54 % |

Comparison Experiment

The procedure is carried out in the same way as described in Example 5 but with 24.2 g (0.1 mol) of 4-chloro-3,5-diaminobenzoic acid isobutyl ester (without salt). The polymer obtained has the following properties:

| | |
|---|---|
| Tensile strength: | 9.0 MPa |
| Structural stability: | 285 N |
| Elongation on tearing: | 830 % |
| Elongation after 1 minute: | 97 % |
| Shore hardness A: | 86 |
| Elasticity: | 47 % |

EXAMPLE 6

Production of a Foam 200 g of a trifunctional copolymer of 87% by weight propylene oxide and 13% by weight ethylene oxide (OH number 28) are mixed with 6.4 g of water, 0.30 g of endoethylenepiperazine, 0.8 g of triethylamine and 2.0 g of a commercial polyether polysiloxane foam stabilizer (stabilizer OS 70 of Goldschmidt AG, Germany). 4 g of 3,5-diamino-4-chlorobenzoic acid isobutyl ester and 2 g of the ammonium salt of 3,5-diamino-4-chlorobenzoic acid dissolved in 6 g of isopropanol, followed by 49.2 g of trimerized tolylene diisocyanate (80% 2,4- and 20% 2,6-isomer; NCO-content of the polyisocyanate: 40%) are then stirred in. The reaction mixture is poured into an open mold. The product ist heated for 2 hours at 80° C. after foaming has terminated.

A foam having the following properties is obtained:

| | |
|---|---|
| Tensile strength: | 165 KPa |
| Tear propagation resistance | 0.39 KN/m |
| Elongation at break: | 145 % |
| Pressure deformation residue (22 hours at 70° C, $\epsilon_{50\%}$) | 7 % |

Comparison Experiment

The procedure is carried out in the same way as described in Example 6 but with 6 g of 3,5-diamino-4-chlorobenzoic acid isobutyl ester (i.e. without salt).

The foam obtained has the following properties:

| | |
|---|---|
| Tensile strength: | 145 KPa |
| Tear propagation resistance: | 0.33 KN/m |
| Elongation at break | 160 % |
| Pressure deformation residue (22 hours at 70° C, $\epsilon_{50\%}$) | 10 % |

EXAMPLE 7

100 parts by weight of a prepolymer (NCO-content: 3.5% by weight) from toluylene diisocyanate (80% 2,4- and 20% 2,6-isomer) and a linear polypropylene glycol with a molecular weight of 2.000 are mixed at 50° C. with 7,5 parts by weight of a solution of 10 g of the Li-salt of 2,6-diamino toluene-4-sulfonic acid in 100 g of 3,5-diethyl-2,4-diamino toluene. The mixture which remains castable for about 5 minutes is cast into a mould heated to 110° C. and can be removed from that mould after about 5 minutes. The elastomer is cured at 110° C. for 24 hours. A polymer having the following properties is obtained:

| | |
|---|---|
| Tensile strength: | 8,5 MPa |
| Structural stability: | 277 N |
| Elongation on tearing: | 768 % |
| Shore-Hardness A | 79 |
| Elasticity: | 60 % |

Comparison Experiment

An elastomer is prepared in the same way as described in example 7, but using 7,4 parts by weight of 3,5-diethyl-2,4-diamino-toluene (i.e. without salt). The polymer obtained has the following properties:

| | |
|---|---|
| Tensile strength: | 6,0 MPa |
| Structural stability: | 196 N |
| Elongation on tearing: | 350 % |
| Shore-hardness A: | 79 |
| Elasticity: | 52 |

What is claimed is:

1. In a process for the production of cellular or non-cellular polyurethane urea elastomers comprising reacting:
    (a) organic polyisocyanates;
    (b) organic compounds having molecular weights of from 400 to 10,000 and containing at least two Zerewitinoff active hydrogen atoms; and
    (c) aromatic diamines as chain extending agents;
the improvement wherein compound (c) comprises a quantity of from 2 to 50 mol percent, based on the total molar quantity of (c), of ($c_1$) aromatic diamines having at least one carboxylic or sulphonic acid group in a form selected from the group consisting of metal salts, substituted ammonium salts or unsubstituted ammonium salts and 98 to 50 mol percent of ($c_2$) aromatic diamines containing at least one carboxylic acid ester or sulphonic acid ester group.

2. The process of claim 1 wherein additional organic compounds having molecular weights of from 32 to 400 and having at least two isocyanate-reactive hydrogen atoms are included in the reaction mixture as chain extending agents.

3. The process of claim 2 wherein the reaction mixture also contains blowing agents and/or catalysts and/or other additives.

4. The process of claim 1, characterized in that the compounds used as component ($c_2$) are aromatic diamino carboxylic acid esters represented by the following general formula

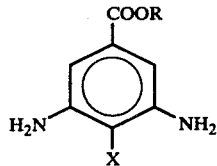

wherein
R represents an aliphatic or cycloaliphatic group with 1 to 18 C atoms which may be branched and/or contain oxygen as a hetero atom, and
X represents hydrogen, a halogen atom, a straight chain or branched alkyl or alkoxy group having from 1 to 18 C atoms, a trifluoromethyl group or a cyano group.

5. The process of claim 1, characterized in that the compounds used as component ($c_2$) are compounds represented by the following general formula

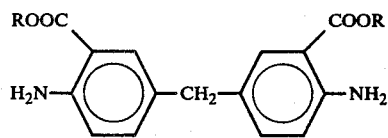

wherein
R represents an aliphatic or cycloaliphatic group with 1 to 18 C atoms which may be branched and/or contain oxygen as a hetero atom.

6. The process of claim 1, characterized in that the compound used as component ($c_1$) is a salt of the aromatic diaminocarboxylic acid or diaminosulphonic acid which is formed when the ester groups of component ($c_2$) are saponified.

7. The process of claim 1, characterized in that component ($c_1$) is used in the form of an unsubstituted ammonium salt, an ammonium salt of a primary, secondary or tertiary amine having from 1 to 15 C atoms, an alkali metal salt or a salt of a metal of the Second or Third Main or sub-Group of the Periodic System of Elements.

8. The process of claim 1 wherein component ($c_1$) is used in an amount of from 2 to 20 mol percent based on the amount of component (c).